United States Patent Office 2,699,306
Patented Jan. 11, 1955

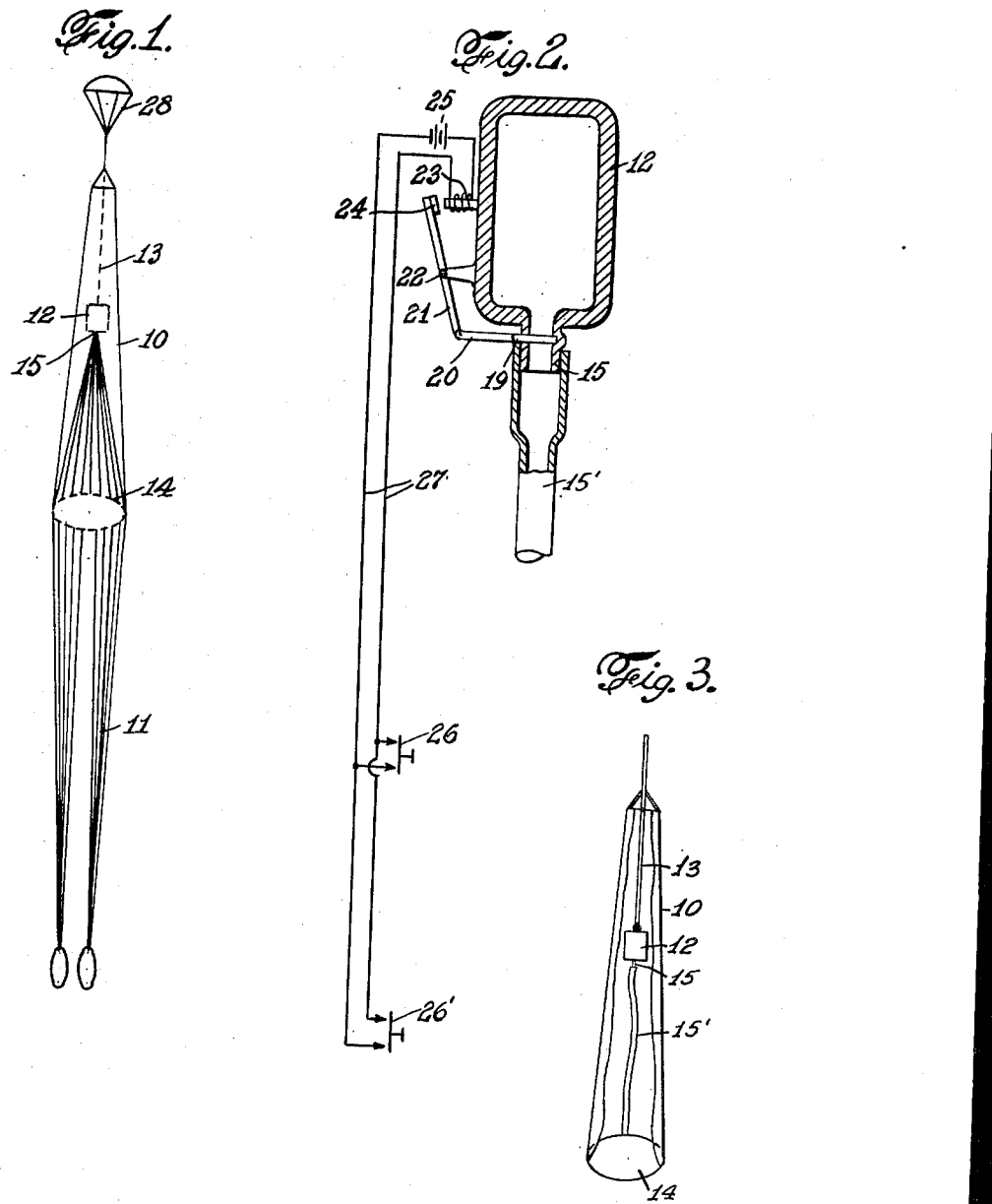

2,699,306

COMPRESSED AIR OPERATING MEMBER IN CONNECTION WITH PARACHUTE

Alfred Ambear, Rutherford, N. J.

Application November 12, 1952, Serial No. 319,936

1 Claim. (Cl. 244—149)

This invention relates to new and useful improvements in parachutes, and it has for its object to provide means, whereby substantially to eliminate the many accidents that happen each year as well in military as in private aviation, when the pilot, or occupants of an aeroplane fall down and get killed, due to the fact that a parachute does not open, or does not open sufficiently, in time to check the force of descent by the party using it.

However, this invention provides means, whereby such conditions may be substantially avoided.

The said means consists in the arrangement of a deflated balloon of a size relative to the parachute.

This balloon is disposed at one end, that is in the lower part of the parachute, and said balloon, when inflated, generally has an extension, or expansion width in diameter of 18 to 36 inches.

Above the balloon in the parachute, but connected to the top of said balloon by means of a tube, is arranged an for instance cylindrically-shaped, enclosure made of any suitable material, and containing compressed air, which by a control mechanism may be directed from said enclosure to the balloon, by the pilot upon his descent, simultaneously with that he pulls the ripcord to open the parachute.

Through such manipulation by the pilot, the balloon is immediately inflated, as the compressed air rushes into the latter, and said balloon will, in turn, by thus spreading out, force the parachute to open at an even pressure.

The relation between the amount of compressed air and the strength of the walls of the balloon must be such that, when the latter is blown up to a certain size, the said walls will split open as the balloon explodes, and with the compressed air thus let out, which all takes place in a split second, this air will, in turn, add to a smooth and quick opening of the parachute before it reaches an excessive downward speed.

In this way any forceful rupture of the parachute, which will open at an even pressure, will be eliminated.

With the above and other objects in view, this invention consists of the novel features of construction, combination and arrangement of parts, hereinafter fully described, claimed and illustrated in the accompanying drawing, forming part of this application, and in which similar characters of reference indicate corresponding parts in all views, and in which:

Figure 1 shows in elevational view a parachute, and, in dotted lines, within the latter a deflated balloon connected to a cylindrically shaped member containing compressed air.

Figure 2 is a detail view, in elevation, of the construction of the control mechanism for operating my device.

Figure 3 is a detail view, showing parts broken off.

Referring more particularly to the drawing, the numeral 10 indicates a parachute, and 11 the conventional shrouds, or ropes, attached to the latter and provided with the conventional means for supporting a person descending from an aeroplane.

Within the parachute is arranged a cylindrically shaped enclosure 12, made of suitable light material, and secured to the top of the parachute by a rope 13.

The said enclosure 12 is filled with compressed air, which by means of a tube 15 and hose 15' is led to a deflated balloon 14 positioned within the parachute and secured to the latter in any convenient manner, when it is desired to open said balloon.

The construction of the cylindrical enclosure, and its operating parts, is as follows:

The cylinder 12 is provided with a valve 19 (shown diagrammatically as a gate valve) having a closure member 20 connected to a rocker lever 21 pivoted as at 22 to the cylinder.

An electro magnet 23 is mounted fast on the cylinder and cooperates with an armature 24 on the lever 21, whereby attraction of the armature, when the magnet is energized, opens the valve 19.

The magnet is energized by a battery 25 connected in the well known manner to the magnet 23 and a push button 26 by conductors 27. The push button may be located in the perimeter of the parachute, if the latter is packed, in such a way as to enable easy access to that location, or the button may be mounted on the lower ends of the cords 11, where it may be reached even though the jumper be dangling in mid air. Obviously, two buttons may be connected in parallel, as shown at 26', so that a plurality of control points may be located in such a manner that a button is always within the reach of the jumper.

The gate valve 19 leading to the tube 15, and its electromagnetic actuator are shown merely for the purpose of illustration, as it is well known that there are many valves electrically controlled, or operated.

At the same time the right to employ other means for the operation and control of the auxiliary opening device, is hereby reserved.

As is well known, the small parachute 28 comes out and functions, when the rip cord is pulled.

In operation, a person, jumping from an aeroplane with a parachute, pulls the rip cord of the latter, and he simultaneously, or a few seconds after, presses a contact button 26 in order to inflate the balloon, substantially as and for the purpose hereinbefore set forth.

It is obvious that changes may be made in the form, construction and arrangement of the several parts, as shown, within the scope of the appended claims, without departing from the spirit of the invention, and I do not, therefore, wish to limit myself to the exact construction, shown and described herein.

What I claim as new, and wish to secure by Patent of the United States of America, is:

In connection with a parachute, an operating member, comprising in combination, a cylindrically shaped enclosure, filled with compressed air, a parachute secured to said enclosure by a rope, a balloon positioned within the parachute, and a tube integral with said enclosure and connected to said balloon, a valve adapted to cooperate with said tube, a member in elongation of said valve, a lever connected to said member and being pivoted to the cylinder, an electro magnet secured to the enclosure, and an armature mounted on the lever and adapted to cooperate with said magnet, whereby to open the valve, a battery connected to the magnet, and conductors connecting a button to said battery.

References Cited in the file of this patent

UNITED STATES PATENTS

| | | |
|---|---|---|
| 1,328,848 | Ramauge | Jan. 27, 1920 |
| 1,840,618 | Castner | Jan. 12, 1932 |

FOREIGN PATENTS

| | | |
|---|---|---|
| 400,127 | Italy | Nov. 25, 1942 |
| 474,171 | France | Nov. 6, 1914 |
| 852,984 | France | Nov. 18, 1939 |
| 678,131 | Great Britain | Aug. 27, 1952 |